INVENTORS
FRANK C. BENNER
ALBERT DiNARDO
BY
*Oliver W. Hayes*
ATTORNEY

INVENTORS
FRANK C. BENNER
ALBERT Di NARDO
BY
Oliver W. Hayes
ATTORNEY

Patented Aug. 24, 1954

2,687,355

UNITED STATES PATENT OFFICE 2,687,355

PROCESS FOR MAKING SOLUBLE COFFEE CONCENTRATE

Frank C. Benner, Waltham, and Albert Di Nardo, Jamaica Plain, Mass., assignors to National Research Corporation, Cambridge, Mass., a corporation of Massachusetts Application January 21, 1952, Serial No. 267,384

6 Claims. (Cl. 99—71)

This invention relates to coffee and more particularly to improved processes for extracting and drying coffee to produce an improved soluble coffee.

A principal object of the present invention is to provide an improved process for obtaining a secondary extract from coffee grounds which have been previously extracted with water.

Another object of the invention is to provide a secondary extraction process which is simple to control when utilizing unskilled technical personnel.

Still another object of the invention is to provide a secondary extraction process of the above type wherein the spent coffee grounds are hydrolyzed to increase their yield of soluble coffee solids and the hydrolysis catalyst is precipitated by forming a compound which is insoluble over a wide range of temperatures.

Other objects of the invention will in part be obvious and will in part appear hereinafter.

The invention accordingly comprises the process involving the several steps and the relation and the order of one or more of such steps with respect to each of the others which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
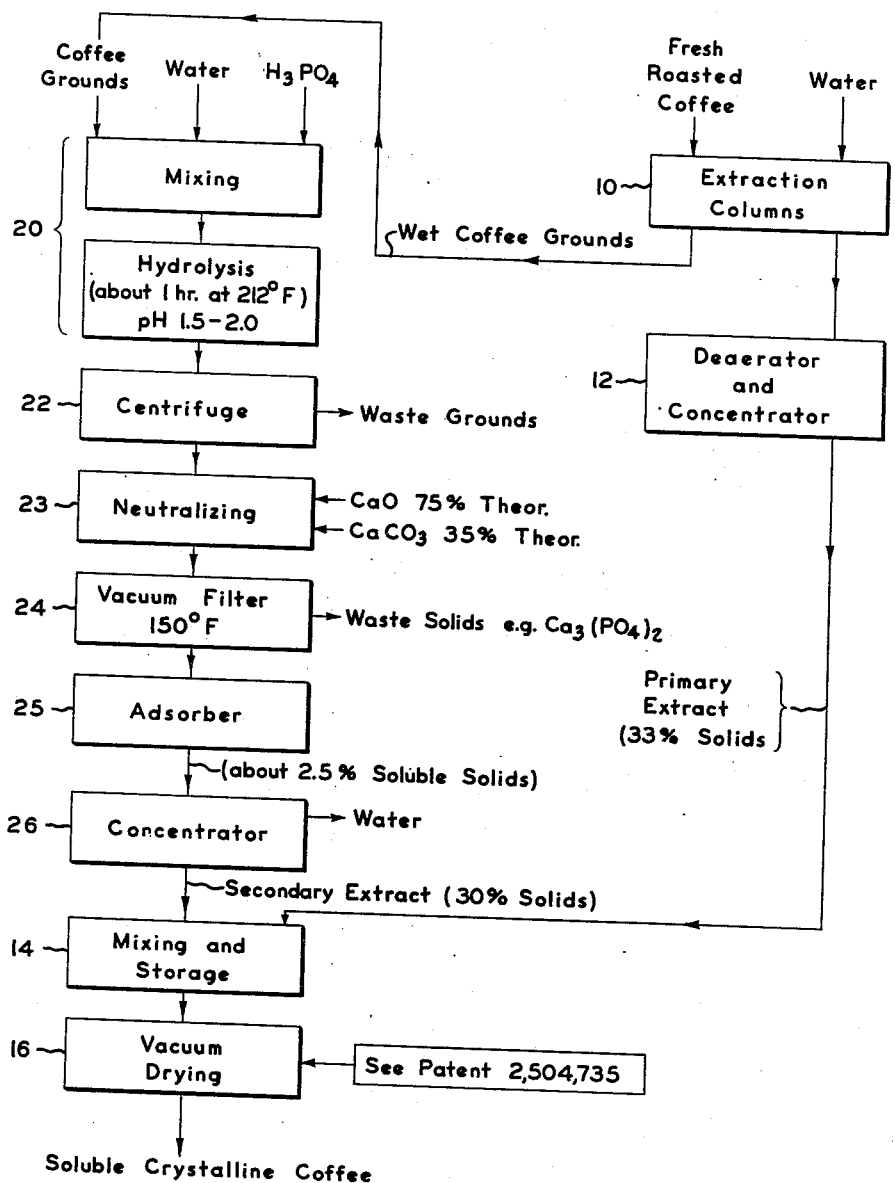
Fig. 1 is a flow sheet showing one process embodying the present invention.

In the present invention, ground roasted coffee beans are placed in extraction columns and extracted with water. This extraction is preferably carried out as a countercurrent extraction so that the solution leaving the extraction columns passes through the freshest coffee. This primary extraction may be carried out with a water temperature between about 100° F. and 230° F. In a preferred embodiment of the invention this extraction gives a soluble solids yield of about 24% to 25% based on the weight of the fresh roasted bean.

A portion of the spent coffee grounds, from which most of the water-soluble solids have been removed, is then treated to remove additional soluble coffee solids by hydrolyzing the grounds to create an essentially tasteless hydrolysis product. The various steps for obtaining this hydrolysis product are shown diagrammatically in Fig. 1, where like numbers refer to like elements in the other figures. In the first step, wet coffee grounds, from the extraction columns 10, and water are put into a mixing chamber 20, the ratio by weight of the dry coffee grounds to the total water being about 1 to 5. For convenience, the coffee grounds are added in the wet condition as they come from the extraction columns. To this mixture of water and coffee grounds there is added sufficient orthophosphoric acid ($H_3PO_4$) to lower the pH of the mixture to about 1.5–2.0. This may be conveniently achieved by adding to the wet coffee grounds about an equal weight of water containing approximately 2% phosphoric acid dissolved therein.

In one preferred embodiment of the invention the various materials initially added to the mixing chamber are as set forth in the following nonlimiting example.

*Example I*

| | Pounds |
|---|---|
| Spent coffee grounds (65% water) | 120 |
| Water | 117.6 |
| Phosphoric acid ($H_3PO_4$) | 2.4 |

The materials added to the mixing chamber are then thoroughly agitated so as to form an aqueous acid suspension of the coffee grounds. This suspension is then preferably heated to a temperature of about 212° F., this temperature being maintained for about one hour to achieve hydrolysis of the coffee grounds. At the end of this time the hydrolyzed mixture is passed to a centrifuge 22 where the waste coffee grounds are discarded and the acidic liquid carrying the dissolved hydrolysis product is separated from these grounds. This acidic liquid is then passed to a neutralizing tank 23 wherein the phosphoric acid in solution is neutralized to a pH of about 5.5 to 7.0.

In a preferred embodiment of the invention this neutralization is a two-stage operation, the majority of the neutralization being achieved by the use of a strongly basic neutralizing agent which is preferably a calcium compound, such as calcium oxide (CaO). This calcium oxide is preferably utilized in an amount which is sufficient to theoretically neutralize only about 75% of the phosphoric acid originally added to the acidic solution. This only partial neutralization is employed so as to obviate the possibility of obtaining a pH greater than 7 since an alkaline pH will cause an irreversible change of flavor and color in the primary coffee extract when the alkaline secondary extract is added thereto. In practice it has been found desirable to add the 75% theoretical amount of calcium oxide (based on the original acid) even though this may be more than enough to neutralize the amount of acid actually present. In connection with the addition of calcium oxide, it should be pointed out that, when the calcium oxide is very finely ground, it is capable of reacting with the solution quite rapidly and care must be taken to be sure that an excess of calcium oxide is not employed. Otherwise, the solution may become alkaline. The speed with which calcium oxide will neutralize the solution is a function of particle size, temperature, and uniformity of mixture, and also depends upon the preparation of the calcium oxide slurry. This is due to the fact that the calcium oxide neutralizes the solution quite slowly. When the pH has risen to about 5, which, for reasons of economy should take place in about 15 minutes, a second neutralizing agent is added to the solution, the second agent being one which is neutral and preferably insoluble in a neutral solution. This second neutralizing agent preferably comprises calcium carbonate ($CaCO_3$) and is added in a slight excess, being used in about 35% of the amount necessary to neutralize the acid initially added to the spent grounds. The calcium compounds added to the neutralizing tank form an insoluble salt with the phosphoric acid, this salt being predominantely tricalcium phosphate, $Ca_3(PO_4)_2$, or dicalcium phosphate, $CaHPO_4.2H_2O$, which precipitates out of the solution.

From the neutralizing tank 23 the tricalcium phosphate precipitate is preferably filtered at a temperature on the order of 150° F. by means of a rotary vacuum filter, the filtrate being recirculated through the filter to achieve complete separation of the insoluble solids from the solids dissolved in the solution. The filtrate leaving the filter is a clear amber solution.

This filtrate is then preferably passed through an adsorption column or tank where it is treated with an adsorbing agent, such as silica gel, activated carbon or the like, to remove from the filtrate any remaining undesirable taste-imparting impurities. At this point the filtrate contains approximately 2.5% soluble solids in solution, and it is desired to concentrate this solution so that the solution contains about 30% soluble solids. This may be achieved by the use of a standard vacuum or atmospheric concentrator which can be operated at a relatively high temperature.

The thus concentrated hydrolysis product is then added to the mixing and storage chamber 14 where it is mixed with the primary extract containing about 33% solids. In a preferred embodiment of the invention the ratio of primary extract soluble solids to secondary extract soluble solids is about 4 to 1. From the mixing and storage tank 14 the mixture of the primary and secondary extracts is fed to a vacuum drying device of the type shown in U. S. Patent 2,504,735, the product of this vacuum drying operation being a soluble crystalline coffee.

Figure 2:
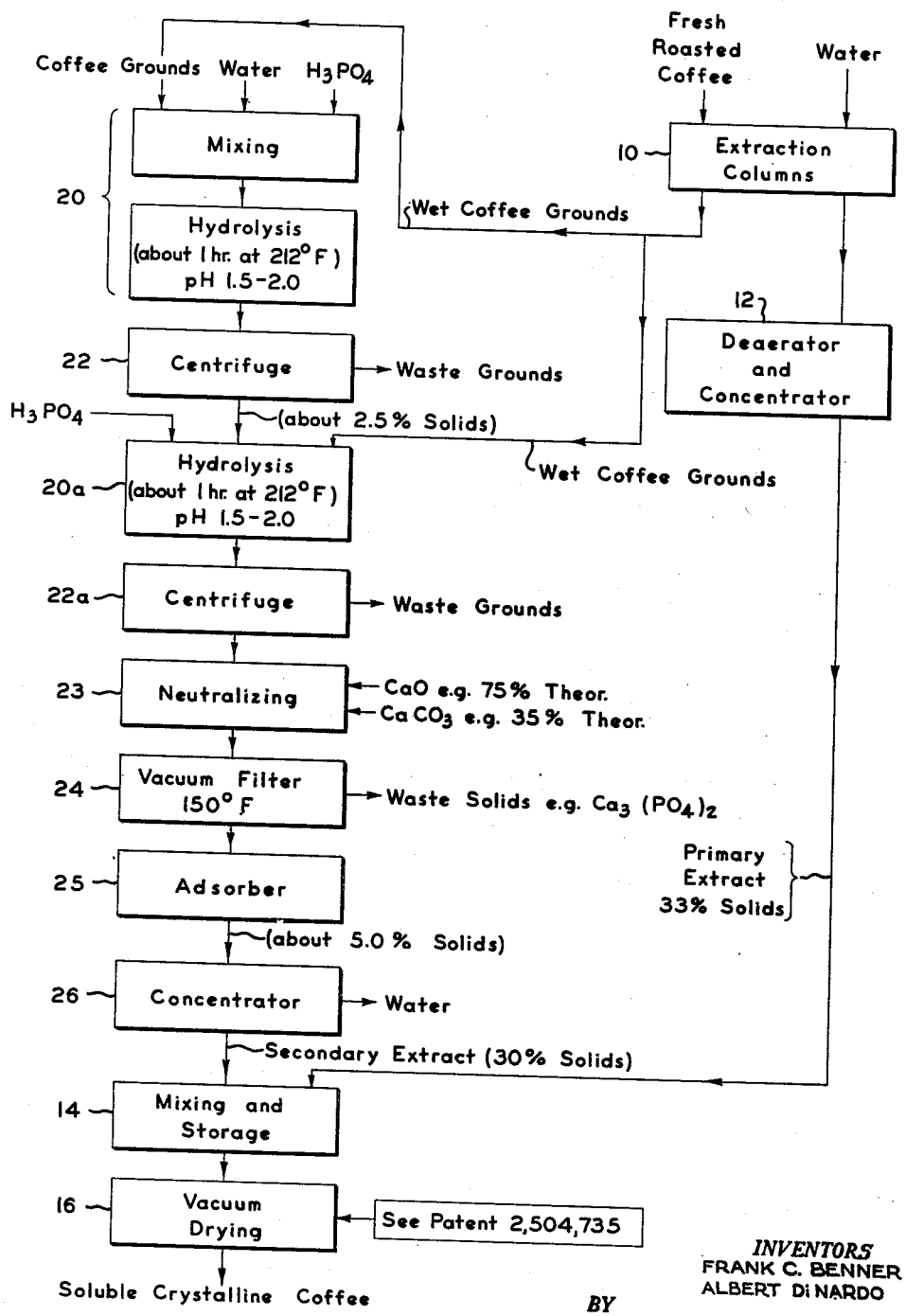
Fig. 2 is a flow sheet showing another process embodying the present invention.

Referring now to Fig. 2 there is shown an alternative embodiment of the invention described in connection with Fig. 1. This second embodiment differs from the first embodiment primarily in the fact that the dilute acidic solution from the hydrolysis of a first batch of spent coffee grounds is utilized to extract a second batch of spent coffee grounds. This embodiment has the advantage that the hydrolysis solution leaving the second batch of spent coffee grounds contains about 5% soluble solids, and thus requires that only half as much water must be removed during concentration as for the final hydrolysis product of Fig. 1, which contains only about 2.5% dissolved solids. In this Fig. 2 the acidic liquid leaving the centrifuge 22 contains about 2.5% soluble solids. This acidic liquid is fed to a second hydrolysis chamber 20a to which is also fed an amount of wet (65% water) coffee grounds about equal to the weight of the acid liquid plus added acid from the first hydrolysis step.

The amount of materials fed to this second hydrolysis chamber 20a may be in accordance with Example II set forth below:

*Example II*

|  |  | Pounds |
|---|---|---|
| Spent coffee grounds (65% water) | | 120 |
| Acidic liquid | Soluble solids 2.5 lbs. <br> Water 113.5 lbs. <br> Free $H_3PO_4$ .5 lbs. | 116.5 |
| Phosphoric acid ($H_3PO_4$) | | Approx. 2.4 |

The hydrolysis of this second batch of coffee grounds is accomplished in the same manner as set forth in connection with the hydrolysis of the first batch of coffee grounds; that is, the hydrolysis is achieved at a temperature of about 212° F. for a time of about one hour. Thereafter the waste grounds are separated from the hydrolysis liquid in centrifuge 22a and the resultant liquid is neutralized in tank 23. One specific example showing the quantities of neutralizing materials used in Fig. 2 is given in Example III. In this case the acidic liquid leaving the centrifuge is assumed to have approximately 5.0 lbs. of soluble solids, about 0.5 lbs. of free phosphoric acid, and about 109 lbs. of water.

*Example III*

| | Pounds |
|---|---|
| Calcium oxide (CaO) | 1.65 |
| Calcium carbonate | 1.32 |

In connection with the preceding discussion it should be noted that a considerable amount of the phosphoric acid added during the processing is lost and is not accounted for in the material balance. A high percentage of this acid is thrown away with the waste grounds which leave the centrifuge, while still other portions of this acid are believed to be tied up in the form of organic complexes. However, the amount of calcium oxide utilized for partially neutralizing the phosphoric acid in the acidic liquid is based on the quantity of phosphoric acid present in the liquid in the second hydrolysis step of the process so that the pH of the liquid is rapidly raised to a pH of about 5. In connection with the addition of the calcium oxide, the precautions mentioned previously should be observed. The calcium carbonate is then added to bring the pH up to about 6–7. The product is then immediately filtered to separate the excess calcium oxide and calcium carbonate, thus preventing the pH from rising above 7.

Figure 3:
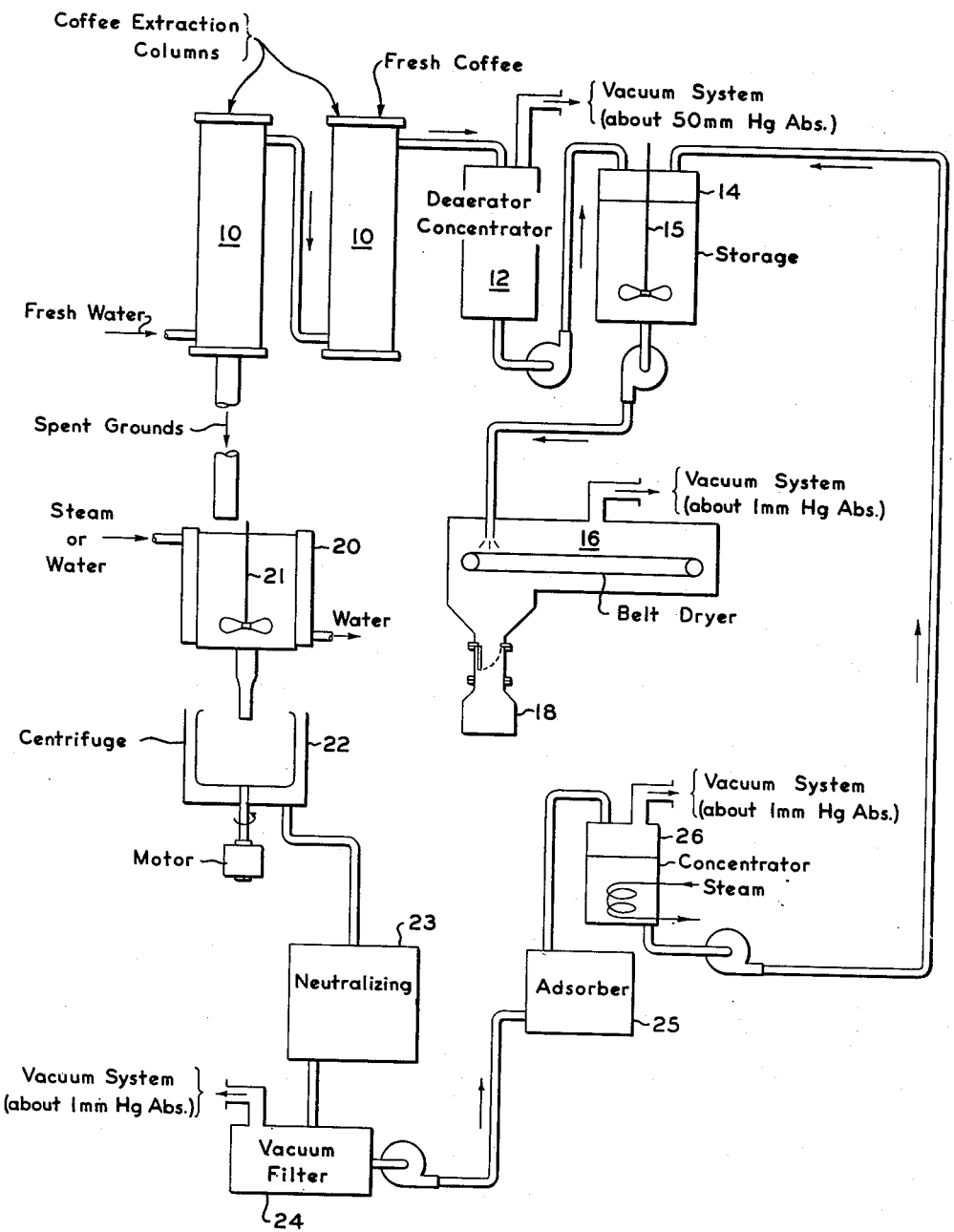
Fig. 3 is a schematic, diagrammatic view of one arrangement of processing equipment employed in practicing one embodiment of the invention.

The remainder of the steps in Fig. 3 are preferably identical to those discussed in connection with Fig. 1, with the exception, however, that only half as much concentration of the secondary extract is necessary in the concentrator 26.

Referring now to Fig. 3, where like numbers refer to like elements in the preceding figure, there is shown one embodiment of an apparatus for accomplishing the present invention. There are provided a number of coffee extraction columns 10 in which fresh, ground, roasted coffee is placed. For simplicity only two of these columns are illustrated, a larger number (7–9) being usually provided. The coffee is preferably extracted by running fresh hot water into the most spent bean and having it pass out of the columns containing the freshest bean. The coffee extract obtained from the extraction columns is next piped into a deaerator and concentrator 12, which is connected to a vacuum system of about 50 mm. Hg. abs. to remove air from the extract. If desired, heat and recirculation can be applied to the deaerator 12 so as to remove some of the water from the extract. The deaerator primary extract is then piped to a storage tank 14 which may be equipped with an agitator 15 for assuring uniform mixture of the materials therein. From the storage tank the extract mixture is pumped into a vacuum belt drier 16, of the type described more completely in U. S. Patent 2,504,735. In the belt drier the extract mixture is dried to a crystalline powder in a short time at a high vacuum of about 1 mm., the crystalline powder being collected in a vacuum dolly 18.

The spent coffee grounds from one or more of the extraction columns 10 is placed into a mixing or cooking pot 20, provided with an agitator 21. It is in this cooking pot that the hydrolysis reaction is preferably accomplished. This pot 20 is preferably provided with a jacket through which steam or hot water may be circulated so as to provide the desired temperature during the hydrolysis step. From the cooking pot the hydrolyzed suspension is passed to a centrifuge 22 where most of the solids are separated from the liquid solution of the hydrolyzed product. This liquid solution is then passed to a neutralizing tank 23 where the phosphoric acid may be neutralized. From neutralizing tank 23 the liquid solution, containing the insoluble tricalcium phosphate, goes to a vacuum filter 24 where all of the insoluble solids are removed from the solution. The resultant clear solution is then preferably passed through an adsorption column 25 in which any undesirable taste-imparting materials are removed from the solution. From the adsorption column 25 the final liquid, containing 2.5 or 5.0% soluble solids (depending upon whether the process of Fig. 1 or Fig. 2 has been utilized) is passed to a concentrator 26 where the liquid may be heated (under a vacuum of about 100 mm. if desired) to remove a large percentage of the water so that the liquid contains about 30% soluble solids. This concentrated liquid is then pumped to the mixing and storage chamber 14 where it is combined with the primary extract. In a preferred embodiment the concentrated hydrolysis solution is added to the mixing chamber in an amount such as to give a ratio of about 4 parts by weight of soluble coffee solids to 1 part by weight of the soluble solids resulting from the hydrolysis step. As explained previously this mixture is thoroughly stirred by the agitator 15 and the resultant mixture is dried in vacuum drier 16.

In the above process the vacuum removal of water vapor may be achieved in a number of known methods, such for example as those described by Schroeder and Schwarz in Chemical Engineering Progress, vol. 45, No. 6, June 1949, pages 370–376.

In connection with the use of calcium oxide it is not essential that it be employed as the oxide, and calcium hydroxide $(Ca(OH)_2)$ may be used in lieu thereof. This calcium hydroxide may be formed by preparing a water slurry of the calcium oxide prior to the addition of the CaO to the acidic solution. In all cases, however, it is preferred that the neutralization with calcium oxide be incomplete and that calcium carbonate be used in excess to complete the neutralization. This latter feature of the invention has the advantage that the calcium carbonate is relatively insoluble in a neutral solution so that only enough calcium carbonate is dissolved to neutralize the remaining phosphoric acid. The undissolved calcium oxide and calcium carbonate are then removed from the neutralized solution along with the precipitated tricalcium phosphate. While calcium carbonate can be employed for the complete neutralization it is undesirable since its use causes considerable foaming (due to $CO_2$ evolution) when it is added to a strongly acid solution. Also, calcium carbonate is more expensive than calcium oxide.

In the above description the hydrolysis of the spent coffee grounds has been shown as taking place in a separate hydrolysis tank. While this is preferred, this hydrolysis can be achieved in the extraction columns after the primary extraction has been completed. Equally one specific type of adsorption agent (i. e., silica gel) has been mentioned previously. Numerous other adsorption agents such as fuller's earth, activated carbon, charcoal, and diatomaceous earth may be employed.

While calcium oxide and calcium carbonate have been described as preferred neutralizing agents, magnesium oxide, magnesium hydroxide, and magnesium carbonate can be used in lieu of the corresponding calcium compounds without departing from the spirit of the invention. Where magnesium oxide or magnesium carbonate are employed, the same general conditions of neutralization apply and corresponding molar quantities of the magnesium compounds may be substituted for the calcium compounds.

With all of the strongly basic neutralizing agents (e. g., calcium oxide or magnesium oxide) it is important that any excess undissolved neutralizing agent be removed as soon as the pH of the hydrolysis product has reached the desired range of pH 5.5–7.0. If this not done the solution may become alkaline, and may thus have a deleterious effect upon the primary extract when the hydrolysis product is added thereto.

Since certain changes may be made in the above process without departing from the scope of the invention herein involved, it is intended that all matter contained in the above description, or shown in the accompanying drawings, shall be interpreted as illustrative and not in a limiting sense.

What is claimed is:

1. The process of producing a soluble coffee which comprises extracting soluble coffee solids from roasted, freshly ground coffee by passing water through said coffee; treating at least a portion of the extracted coffee grounds to remove additional soluble coffee solids by hydrolyzing said grounds to create an essentially tasteless hydrolysis product, said hydrolysis step comprising the steps of hydrolyzing said spent coffee grounds in an aqueous phosphoric acid solution having a pH of about 1.5 to 2.0, separating said spent grounds from said solution, adding a first neutralizing agent, from the group consisting of the strongly basic calcium and magnesium compounds, to said solution to convert most of said phosphoric acid to an insoluble precipitate, adding a second neutralizing agent, from the group of calcium and magnesium compounds which are essentially neutral, to convert the remainder of said phosphoric acid to an insoluble precipitate, separating the resulting precipitate and any undissolved neutralizing agent from said solution, purifying said solution to provide a substantially tasteless solution containing substantially no insoluble solids; concentrating said tasteless solution to provide a soluble solids concentration on the order of the soluble solids concentration of said water extract; mixing said concentrated tasteless solution with said extract; and drying said mixture to remove substantially all of the water therefrom.

2. The process of producing a soluble coffee which comprises extracting soluble coffee solids from roasted, freshly ground coffee by passing water through said coffee; treating at least a portion of the extracted coffee grounds to remove additional soluble coffee solids by hydrolyzing said grounds to create an essentially tasteless hydrolysis product; said hydrolysis step comprising the steps of hydrolyzing said spent coffee grounds in an aqueous phosphoric acid solution having a pH of about 1.5 to 2.0, separating said spent grounds from said solution, adding calcium oxide to said solution to convert most of said phosphoric acid to an insoluble calcium phosphate and to raise the pH to about 5.0, adding calcium carbonate to said solution to raise the pH of the solution to about 5.5-7.0, separating the resulting precipitate and any undissolved calcium compounds from said solution, concentrating said solution; and adding said concentrated tasteless solution to said water extract.

3. The process of producing a soluble coffee which comprises extracting soluble coffee solids from roasted, freshly ground coffee by passing water through said coffee; treating at least a portion of the extracted coffee grounds to remove additional soluble coffee solids by hydrolyzing said grounds to create an essentially tasteless hydrolysis product; said hydrolysis step comprising the steps of hydrolyzing said spent coffee grounds in an aqueous phosphoric acid solution having a pH of about 1.5 to 2.0, separating said spent grounds from said solution, adding more phosphoric acid to said solution, utilizing said solution to extract a second batch of spent grounds to increase the soluble solids concentration in said solution to about 5%, adding calcium oxide to said solution to convert most of said phosphoric acid to an insoluble calcium phosphate, adding calcium carbonate to said solution to raise the pH of the solution to about 5.5-7.0, separating the resulting precipitate from said solution, concentrating said solution to provide a solids concentration on the order of the solids concentration of said water extract; adding said concentrated tasteless solution to said extract; and drying said mixture to remove substantially all of the water therefrom.

4. The process of claim 3 wherein there is added to said solution an excess of calcium carbonate over that required to just neutralize the remaining phosphoric acid.

5. The process of claim 2 wherein there is added to said solution an excess of calcium carbonate over that required to just neutralize the remaining phosphoric acid.

6. The process of claim 3 wherein said phosphoric acid is added to said solution prior to extracting said second batch of grounds in an amount sufficient to lower the pH of said solution to between about 1.5 and about 2.0.

References Cited in the file of this patent

UNITED STATES PATENTS

| Number | Name | Date |
| --- | --- | --- |
| 2,573,406 | Clough et al. | Oct. 30, 1951 |